March 30, 1965  J. T. TRACY ETAL  3,175,346
LIFTER MEANS FOR LOW COTTON BOLLS
Filed July 9, 1962  2 Sheets-Sheet 1

INVENTORS
James T. Tracy
Robert M. Frachini
Paul O. Pippel Atty.

March 30, 1965  J. T. TRACY ETAL  3,175,346
LIFTER MEANS FOR LOW COTTON BOLLS
Filed July 9, 1962  2 Sheets-Sheet 2
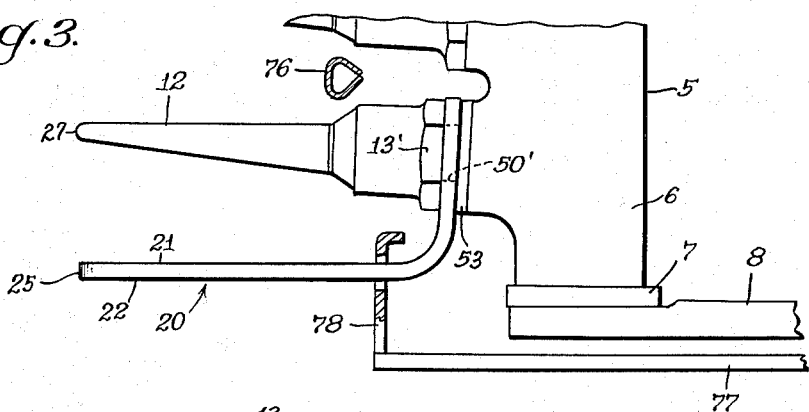
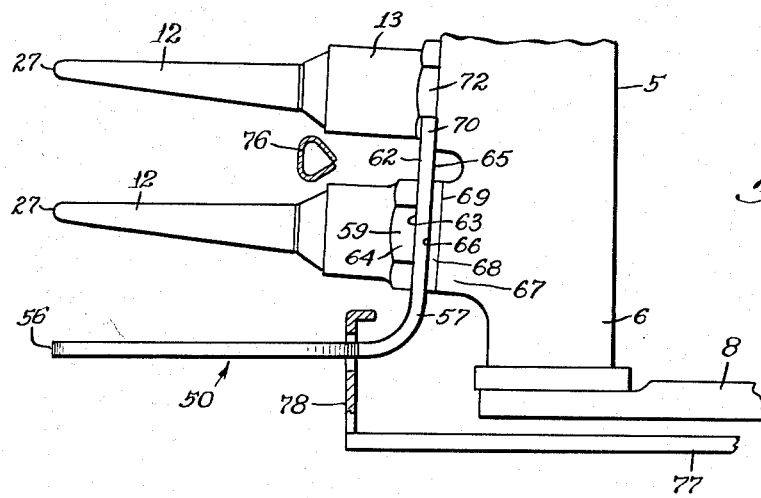
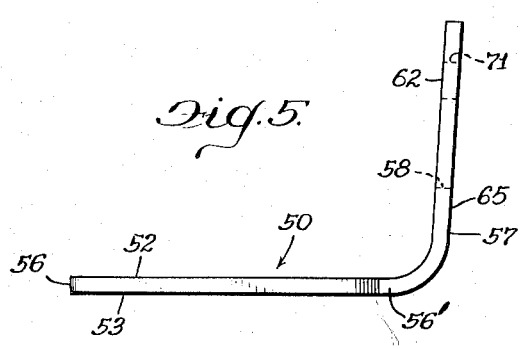
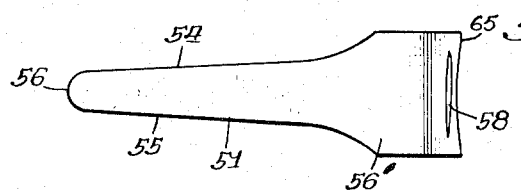
INVENTORS.
James T. Tracy
Robert M. Fachini
Paul O. Pippel
Attys.

United States Patent Office 3,175,346
Patented Mar. 30, 1965

3,175,346
LIFTER MEANS FOR LOW COTTON BOLLS
James T. Tracy and Robert M. Fachini, Memphis, Tenn., assignors to International Harvester Company, Chicago, Ill., a corporation of New Jersey
Filed July 9, 1962, Ser. No. 208,231
6 Claims. (Cl. 56—44)

This invention relates to cotton harvesters, and more specifically to a novel mechanism for lifting the low cotton bolls so that they may be picked by the spindles.

A general object of the invention is to provide a novel, simple and effective low boll cotton lifter means to improve the picking efficiency of a cotton harvester.

A further object of the invention is to provide a novel lifter for low growing cotton on the field plants as the machine traverses through the field and to position such low growing cotton in a position where it can be snagged and plucked off the plant by the spindles.

A still further object of the invention is to provide a novel device for harvesting the low growing cotton plants without materially altering cotton harvesters of proven harvesting ability.

A more specific object of the invention is to provide in a cotton harvester of the type which comprises a drum rotating about a vertical axis, the drum being composed of a plurality of peripheral vertically extending independently movable picker bars each of which supports a plurality of picker spindles, a supplementary plant lifter comprising a stationary finger which is attached to each bar and underposed with respect to the lowermost spindle and extends widthwise generally horizontally and spaced vertically therefrom, the stationary fingers adapted to rake under the plants pursuant to movement of the bar with respect to the plant whereby the lowermost branches or cotton bolls are caused to be elevated and the cotton thereon presented to the picker spindles thereadjacent.

A still further object of the invention is to provide a novel mechanism which comprises a segmented structure composed of a plurality of stationary rake fingers which provide a shield or a platform beneath the drum to prevent the cotton from escaping to the ground.

These and other objects and advantages inherent in and encompassed by the invention will become more readily apparent from the specification and the drawings wherein:

FIG. 3 is a view similar to FIG. 1 of a different embodiment;

FIG. 4 is a view comparable to FIG. 1 illustrating a further embodiment of the invention;

FIG. 5 is an edge elevational view of the spindle backup finger;

FIG. 6 is a rear view; and

FIG. 7 is a bottom view.

Figure 1:
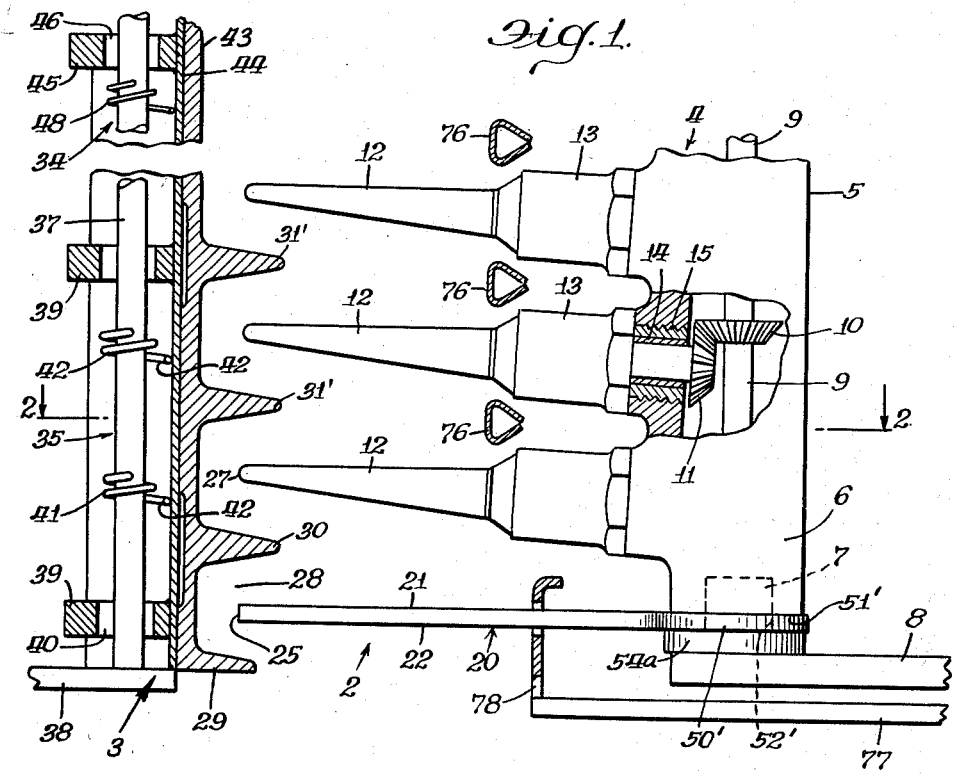
FIG. 1 is a fragmentary vertical cross-sectional view of one embodiment of the invention, the view being taken through the plant throat of a cotton harvesting machine.

Describing the invention in detail the cotton harvester to which the present invention is applicable is of the type shown in U.S. Patent 2,821,832 and which comprises a housing as shown in the patent which defines a plant throat structure 2 through which the plants pass pursuant to forward movement of the harvester, the plants being crowded between a compressor sheet structure generally designated 3 and a picker drum generally designated 4.

The picker drum 4 comprises a plurality of upright columns or picker bars 5 each of which is pivoted at its lower end 6 on a pivot bushing or journal 7 which is carried from the pedestal 8 of the drum, the pedestal 8 serving as the bottom structure of the drum or rotor.

Each column 5 is a hollow tubular member and encases a driving shaft 9 which is connected to a plurality of bevel gears 10 which mate with companion bevel gears 11 on picker spindles 12, there being a series of these vertically spaced spindles on each column. Each spindle is journaled in a nut structure 13 which has an inner end 14 threaded into the support hub 15 in the bar.

The lowermost spindle 12 is backed up by a spindle backup finger or lifter 20 which comprises a finger portion extending generally horizontally, said member 20 being of flat strap or plate structure and preferably having flat top and bottom sides 21 and 22 and outwardly converging lateral edges 23 and 24 which merge into an apex 25. It will thus be seen from a consideration of the profile of the spindles that the width of the finger portion 20 is substantially that of the diameter of the spindle or slightly larger and of substantially matching profile therewith. It will be seen that the apex 25 is in substantial vertical alignment with the apex 27 of the lowermost spindle 12 and that it sweeps into the slot 28 defined by the lowermost throatwise directed flange 29 and the flange or rib 30 thereabove, said ribs 29 and 30 being formed on the compressor sheet portion 35 which is disposed substantially vertically and which forms one side of the throat structure 2 of the harvester. The compressor sheet structure 3 is composed of upper and lower vertically aligned sections 34 and 35 which are independently movable toward and away with respect to the throat structure 2. The lower portion 35 is provided with the series of ribs 29, 30 and 31' and these ribs continue from the bottom up to the sixth spindle whereat the lower compressor sheet terminates. The lower portion 35 as well as the upper portion are movably mounted on the support rod 37 which is suitably fastened to the housing framework 38. The rod 37 passes through a plurality of ears 39 which have enlarged slots 40 receiving the rod 37. The rod 37 supports and is connected to a plurality of torsion springs 41 which have their reactive ends 42 bearing against the backsides of the portion 35 and urge the compression plate throatwise. Similarly the upper compression sheet, which has a substantially flat surface 43 on its throat-forming panel 44, is provided with a series of lugs 45 with openings 46 which admit the rod 37 therethrough, the rod 37 supporting torsion springs 48 which react against the sheet or panel 44 urging it in a throatwise direction. It will be realized that since the upper and lower portions are split and that the heavier stalks of the cotton plants are toward the bottom, the springs 41 are of heavier construction than the spring 48 and exert a much higher pressure against the plants.

Figure 2:
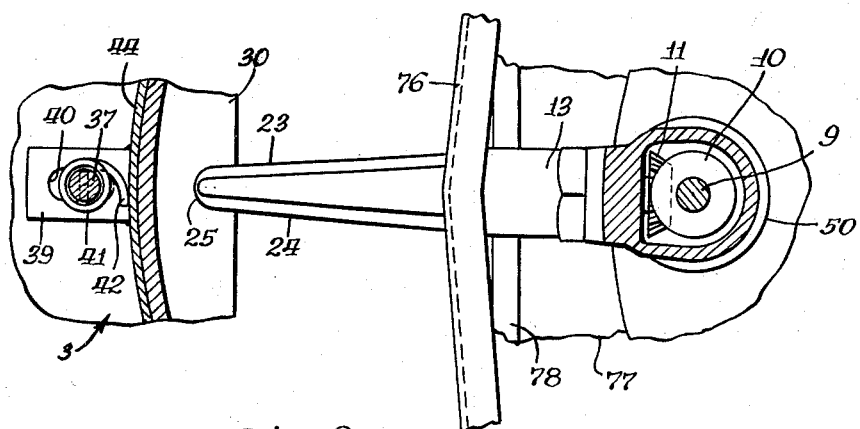
FIG. 2 is a horizontal sectional view taken substantially on the line 2—2 of FIG. 1.

As best seen in FIGS. 1 and 2, the finger 20 is provided at its inner end with an eye 50' which abuts beneath the lower edge 51' of the column 5 and through its aperture 52' admits the pivot portion 7 of the pivot member which has a bushing 54a interposed between the underside of the finger 20 and the pedestal 8.

FIG. 3 shows the finger 20 with its eye 50' turned upwardly and secured to the bar 5 by the nut 13' against boss 53 which is disposed at the lower end 6 of the column 5.

Referring now to the embodiment shown in FIGS. 4 to 7, it will be seen that in essence the construction is similar to that previously described and therefore like parts will be identified with corresponding reference numerals. In the present instance it will be seen that the lower spindle backup finger generally designated 50 is of flat sheet metal and comprises an outwardly tapered finger portion 51 which has flat top and bottom sides 52 and 53 and outwardly converging lateral edges 54 and 55 which terminate in an apex 56 which substantially aligns with the apex of the lowermost spindle designated 12. In the present instance the root end 56' of the finger portion 51 widens out and merges into an upwardly extending securing flange 57 which is apertured as at 58 and sleeves over the inner end portion such as 15 in FIGURE 1 of a special nut 59 which supports the lowermost spindle 12. The forward side 62 of flange 57 engages as at 63 against the backside of the portion 64 of the nut structure 59 and the backside 65 of flange 57 engages as at 66 against a washer 68 which in turn engages as at 69 against the forward side of the lowermost boss 67. It will be seen that the upper end portion 70 of the flange 57 is provided with a concave notch 71 which admits the lower portion of the nut portion 72 of the nut structure 13 which supports the next spindle 12 which is next above the lowermost spindle. Thus in this particular instance the lower spindle backup finger is secured to the bar by means of the nut 59 which secures the lowermost spindle to the bar. It will also be seen that as in the previous embodiment the width of the support finger is slightly greater than the width of the spindle and that the length is such that the apex 56 of the finger 51 terminates substantially in vertical alignment with the apex 27 of the finger 12. It will be seen that as in the previous embodiment the fingers all operate through slat bars 76 which prevent the plants from crowding into the cylinder or picker drum and the slats 76 forming the outline of the throat opposite the compressor sheet structure 32. It will be seen that the lowermost wall 77 of the housing extends beneath the pedestal 8 and that the edge of the wall 77 adjacent to the throat is provided with a deflector slat 78 which rises above the wall and prevents the lowermost branches from crowding into the drum.

What is claimed is:

1. In a cotton harvester, the combination of a drum rotatable about a substantially vertical axis and comprising a plurality of vertical peripheral columns each pivotally mounted for swinging movement about a vertical axis and cotton picking spindles rotatably mounted on the columns and extending outwardly therefrom, cotton lifter means for lifting and presenting cotton on the lowermost portions of a plant to the lowermost spindles on each column, each of said lifter means comprising a rigid element spaced below the respective spindle and having a portion extending outwardly from the respective column and fixedly connected thereto and disposed substantially parallel with the respective spindle in vertical alignment therewith and held in such alignment with the spindle in all positions of the spindle and swingable with the spindle and respective column about the axis of pivot thereof.

2. The invention according to claim 1 wherein said lifter comprises in addition to the portion extending outwardly, a substantially vertical portion serving as a mounting, and means connecting said vertical portion to the associated lowermost spindle and the spindle next thereabove.

3. The invention according to claim 1 and wherein said portion is outwardly tapered and of a width substantially approximating that of the diameter of the spindle.

4. The invention according to claim 1 and said device comprising a vertically extending portion having an opening receiving a lowermost spindle therethrough and having an upper end portion with an upwardly open slot admitting the next succeeding spindle above the lowermost spindle.

5. The invention according to claim 1, and said element being substantially L-shaped and having a pair of angularly related legs, one of said legs being tapered outwardly and the other of said legs having means for mounting attachment to the column.

6. The invention according to claim 1 and said element being substantially flat and having an inner end with an eye complementally receiving and interlocking with an associated column for movement therewith.

References Cited by the Examiner
UNITED STATES PATENTS

| | | | |
|---|---|---|---|
| 2,085,046 | 6/37 | Rust et al. | 56—14 |
| 2,224,286 | 12/40 | Berry | 56—42 |
| 2,699,638 | 1/55 | Rust | 56—42 XR |
| 2,703,955 | 3/55 | Parker et al. | 56—44 |
| 2,743,569 | 5/56 | Barbknecht et al. | 56—44 |
| 3,004,376 | 10/61 | Hubbard | 56—41 |

T. GRAHAM CRAVER, *Primary Examiner.*

RUSSELL R. KINSEY, *Examiner.*